United States Patent
Yan et al.

(10) Patent No.: US 11,550,486 B2
(45) Date of Patent: Jan. 10, 2023

(54) DATA STORAGE METHOD AND APPARATUS

(71) Applicant: HUAWEI TECHNOLOGIES CO., LTD., Guangdong (CN)

(72) Inventors: Haitao Yan, Chengdu (CN); Lin Lin, Chengdu (CN); Mingqian Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/325,287

(22) Filed: May 20, 2021

(65) Prior Publication Data

US 2021/0271405 A1    Sep. 2, 2021

Related U.S. Application Data

(63) Continuation of application No. PCT/CN2019/115215, filed on Nov. 4, 2019.

(30) Foreign Application Priority Data

Nov. 21, 2018   (CN) .......................... 201811394013.6

(51) Int. Cl.
*G06F 3/00* (2006.01)
*G06F 3/06* (2006.01)

(52) U.S. Cl.
CPC .......... *G06F 3/0644* (2013.01); *G06F 3/0604* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 8,566,549 | B1 | 10/2013 | Burke et al. |
| 2011/0035548 | A1 | 2/2011 | Kimmel et al. |
| 2014/0101158 | A1 | 4/2014 | Kraemer et al. |
| 2015/0378838 | A1 | 12/2015 | Oberhofer et al. |

FOREIGN PATENT DOCUMENTS

| | | |
|---|---|---|
| CN | 101281542 A | 10/2008 |
| CN | 102541475 A | 7/2012 |
| CN | 103457963 A | 12/2013 |
| CN | 104283960 A | 1/2015 |
| CN | 104598495 A | 5/2015 |
| CN | 106294421 A | 1/2017 |
| CN | 106326487 A | 1/2017 |

(Continued)

OTHER PUBLICATIONS

Office Action issued in CN201811394013.6, dated Nov. 3, 2020, 8 pages.

(Continued)

*Primary Examiner* — Midys Rojas

(57) ABSTRACT

A data storage method and apparatus are provided. First information of to-be-stored data is first obtained. The first information includes at least one piece of information: a type of the to-be-stored data, a name of the to-be-stored data, and a user identifier corresponding to the to-be-stored data; An expected storage location of the to-be-stored data is determined based on whether the first information of the to-be-stored data meets a condition. At least one data packet in a plurality of data packets of the to-be-stored data is stored in the expected storage location.

19 Claims, 7 Drawing Sheets

(56) References Cited

FOREIGN PATENT DOCUMENTS

| CN | 106484330 A | 3/2017 |
|---|---|---|
| CN | 107729182 A | 2/2018 |
| CN | 108268217 A | 7/2018 |
| CN | 108846064 A | 11/2018 |
| JP | 2016071601 A | 5/2016 |
| WO | 2014149333 A1 | 9/2014 |

OTHER PUBLICATIONS

Notice of Allowance issued in CN201811394013.6, dated Apr. 20, 2021, 4 pages.
International Search Report and Written Opinion issued in PCT/CN2019/115215, dated Jan. 23, 2020, 9 pages.
Extended European Search Report issued in EP19887741.7, dated Nov. 22, 2021, 7 pages.

DATA STORAGE METHOD AND APPARATUS

CROSS-REFERENCE TO RELATED APPLICATIONS

This application is a continuation of International Application No. PCT/CN2019/115215, filed on Nov. 4, 2019, which claims priority to Chinese Patent Application No. 201811394013.6, filed on Nov. 21, 2018. The disclosures of the aforementioned applications are hereby incorporated by reference in their entireties.

TECHNICAL FIELD

This disclosure relates to the field of storage technologies, and in particular, to a data storage method and apparatus.

BACKGROUND

With rapid increase of internet users and diversified development of services, more data (for example, user data and service configuration data) needs to be stored by using a storage system, for service analysis and service guidance. A tiered storage technology is introduced to improve storage performance of the storage system. A main idea of the tiered storage technology is to separately store different data in storage media with different performance based on indicators such as data importance and data access frequency. For example, data with relatively low access frequency is stored onto a hard disk drive (HDD) with a relatively low read/write speed in the storage system, and data with relatively high access frequency is stored onto a solid state drive (SSD) with a relatively high read/write speed in the storage system. This can improve a read/write speed of the storage system.

In the conventional technology, the storage system using the tiered storage technology usually scans, at a regular interval (for example, every other week), data stored in the entire storage system, to determine whether the data stored in the storage system meets a preset tiered storage policy (for example, storing data with relatively low access frequency onto the HDD or storing data with relatively high access frequency onto the SSD). If a part of data in the storage system does not meet the tiered storage policy, for example, a data block 1 is data with relatively low access frequency but is stored on the SSD, the part of data needs to be migrated to an expected storage medium, that is, the data block 1 is migrated to the HDD.

After scanning the data stored in the entire storage system, if it is determined that a large amount of data needs to be migrated, the storage system needs to consume a large quantity of resources (for example, input/output (I/O) resources) to migrate, to the expected storage medium, the data that needs to be migrated. Consequently, storage performance of the storage system deteriorates.

SUMMARY

This disclosure provides a data storage method and apparatus, to improve storage performance of a storage system.

According to a first aspect, a data storage method is provided and applied to a storage system. In the method, when data is to be stored, first information of to-be-stored data is first obtained. The first information includes at least one piece of information: a type of the to-be-stored data, a name of the to-be-stored data, and a user identifier corresponding to the to-be-stored data. Then, an expected storage location of the to-be-stored data is determined based on whether the first information of the to-be-stored data meets a condition. For example, when the obtained at least one piece of information of the to-be-stored data meets the condition, it is determined that the expected storage location is a first storage space whose read/write performance is higher than or equal to a threshold in the storage system; otherwise, it is determined that the expected storage location is a second storage space whose read/write performance is lower than the threshold in the storage system. Thereafter, at least one data packet in a plurality of data packets of the to-be-stored data is stored in the expected storage location.

In the foregoing technical solution, when data is to be stored, an expected storage location is determined according to a preset policy of the storage system and based on at least one piece of information: a type of the data, a name of the data, and a user identifier corresponding to the data. A data packet of the data is stored in the location. In this way, the data does not need to be migrated subsequently. This can reduce an amount of data that needs to be migrated, reduce resource consumption of the storage system during data migration, and improve storage performance of the storage system.

In an example embodiment, the condition includes at least one of the following conditions:
the type of the to-be-stored data is the same as a preset type;
the name of the to-be-stored data is the same as a preset name; and
the user identifier corresponding to the to-be-stored data is the same as a preset user identifier.

In the foregoing technical solution, the expected storage location of the data may be determined in a plurality of different manners, to improve flexibility of the storage system.

In an example embodiment, before no data packet in the plurality of data packets of the to-be-stored data is stored in the storage system, the first information of the to-be-stored data is obtained to determine the expected storage location of the to-be-stored data. To be specific, after the expected storage location of the to-be-stored data is determined, the data packet of the to-be-stored data is stored. In this way, when the plurality of data packets of the to-be-stored data are stored, each data packet in the plurality of data packets is stored in the determined expected storage location.

In the foregoing technical solution, because each data packet of the to-be-stored data has been stored in the expected storage location, all data stored in the storage system does not need to be migrated. Therefore, the storage system may skip a process of scanning the data to determine data that needs to be migrated. This can improve storage performance of the storage system.

In an example embodiment, a part of data packets in the plurality of data packets of the to-be-stored data may be first stored in a first location. The first location is different from the expected storage location, for example, may be a location preset by the storage system. Then, the first information of the to-be-stored data is obtained to determine the expected storage location of the to-be-stored data. Thereafter, a data packet other than the part of data packets that are stored in the first location in the plurality of data packets of the to-be-stored data is stored in the expected storage location. In this case, the plurality of data packets of the to-be-stored data are stored in different storage spaces.

In the foregoing technical solution, after the to-be-stored data is obtained, the part of data packets of the data are first stored in a default location, and then the expected storage location of the data is determined during storage. This can reduce response duration of the storage system when the data is stored. In addition, because the part of data packets of the to-be-stored data has been stored in the expected storage location when the to-be-stored data is stored, the storage system needs to perform data migration only on the part of data packets of the to-be-stored data. This can reduce an amount of data that needs to be migrated, and improve storage performance of the storage system.

In an example embodiment, the storage system may further record a storage status of the to-be-stored data. The storage status includes a first storage status in which the plurality of data packets of the to-be-stored data are stored in the expected storage location and a second storage status in which the plurality of data packets of the to-be-stored data are separately stored in the first location and the expected storage location. Then, whether to perform data migration may be determined based on the obtained storage status of the to-be-stored data. For example, if the storage status of the to-be-stored data indicates that the to-be-stored data is in the second storage status, the storage system may migrate, to the expected storage location, the part of data packets of the to-be-stored data stored in the first location. In this way, the storage system may determine, based on the storage status of the to-be-stored data, whether to perform data migration. This can reduce complexity of scanning.

Further, after completing data migration of the to-be-stored data, the storage system may further adjust the storage status of the to-be-stored data from the second storage status to the first storage status. In this way, when the storage system performs scanning again, the to-be-stored data may not need to be migrated.

According to a second aspect, a data storage apparatus is provided. The data storage apparatus includes a processor, configured to implement the method described in the first aspect. The data storage apparatus may further include a memory, configured to store program instructions and data. The memory is coupled to the processor, and the processor may invoke and execute the program instructions stored in the memory, to implement any method in the methods described in the first aspect. The data storage apparatus may further include a communications interface. The communications interface is used by the data storage apparatus to communicate with another device.

In an example embodiment, the processor is configured to: obtain first information of to-be-stored data, where the first information includes at least one piece of information: a type of the to-be-stored data, a name of the to-be-stored data, and a user identifier corresponding to the to-be-stored data; and determine an expected storage location of the to-be-stored data based on the first information of the to-be-stored data and according to a preset policy. The preset policy is: when the first information meets a condition, determining that the expected storage location is a first storage space, otherwise, determining that the expected storage location is a second storage space. The first storage space is a storage space whose read/write performance is higher than or equal to a threshold in a storage system, and the second storage space is a storage space whose read/write performance is lower than the threshold in the storage system.

The processor is further configured to store, in the expected storage location, at least one data packet in a plurality of data packets of the to-be-stored data received through the communications interface.

In an example embodiment, the condition includes at least one of the following conditions:

the type of the to-be-stored data is the same as a preset type;
the name of the to-be-stored data is the same as a preset name; and
the user identifier corresponding to the to-be-stored data is the same as a preset user identifier.

In an example embodiment, when the processor obtains the first information of the to-be-stored data, the processor is specifically configured to: before no data packet in the plurality of data packets of the to-be-stored data received through the communications interface is stored in the storage system, obtain the first information of the to-be-stored data.

When the processor stores, in the expected storage location, the at least one data packet in the plurality of data packets of the to-be-stored data received through the communications interface, the processor is specifically configured to store each data packet in the plurality of data packets in the expected storage location.

In an example embodiment, the processor is further configured to: before obtaining the first information of the to-be-stored data, store, in a first location, a part of data packets in the plurality of data packets of the to-be-stored data received through the communications interface. The first location is different from the expected storage location.

When the processor stores, in the expected storage location, the at least one data packet in the plurality of data packets of the to-be-stored data received through the communications interface, the processor is specifically configured to store a data packet other than the part of data packets in the plurality of data packets in the expected storage location.

In an example embodiment, the processor is further configured to record a storage status of the to-be-stored data. The storage status includes a first storage status and a second storage status. The first storage status is a status in which the plurality of data packets of the to-be-stored data are stored in the expected storage location, and the second storage status is a status in which the plurality of data packets of the to-be-stored data are separately stored in the first location and the expected storage location. Then, the storage status of the to-be-stored data may be obtained. If the storage status of the to-be-stored data indicates that the to-be-stored data is in the second storage status, the part of data packets of the to-be-stored data may be migrated from the first location to the expected storage location, and the storage status of the to-be-stored data is adjusted from the second storage status to the first storage status.

According to a third aspect, a data storage apparatus is provided. The data storage apparatus may be a storage system, or may be an apparatus in a storage system. The data storage apparatus may include a processing module and a communications module. The modules may perform corresponding functions performed by the storage system in any one of the design examples in the first aspect. Details are as follows:

The processing module is configured to: obtain first information of to-be-stored data, where the first information includes at least one piece of information: a type of the to-be-stored data, a name of the to-be-stored data, and a user identifier corresponding to the to-be-stored data; and determine an expected storage location of the to-be-stored data based on the first information of the to-be-stored data and according to a preset policy, where the preset policy is: when the first information meets a condition, determining that the expected storage location is a first storage space, otherwise, determining that the expected storage location is a second storage space. The first storage space is a storage space whose read/write performance is higher than or equal to a threshold in the storage system, and the second storage space is a storage space whose read/write performance is lower than the threshold in the storage system. The processing module is further configured to store, in the expected storage location, at least one data packet in a plurality of data packets of the to-be-stored data received by the communications module.

According to a fourth aspect, an embodiment of this disclosure further provides a computer-readable storage medium including instructions. When the instructions are run on a computer, the computer is enabled to perform the method according to the first aspect.

According to a fifth aspect, an embodiment of this disclosure further provides a computer program product including instructions. When the computer program product is run on a computer, the computer is enabled to perform the method according to the first aspect.

According to a sixth aspect, an embodiment of this disclosure provides a chip system. The chip system includes a processor and may further include a memory, and is configured to implement the method according to the first aspect. The chip system may include a chip, or may include a chip and another discrete component.

For beneficial effects of the second aspect to the sixth aspect and the implementations of the second aspect to the sixth aspect, refer to descriptions of beneficial effects of the method in the first aspect and the implementations of the first aspect.

DESCRIPTION OF EMBODIMENTS

Figure 1:
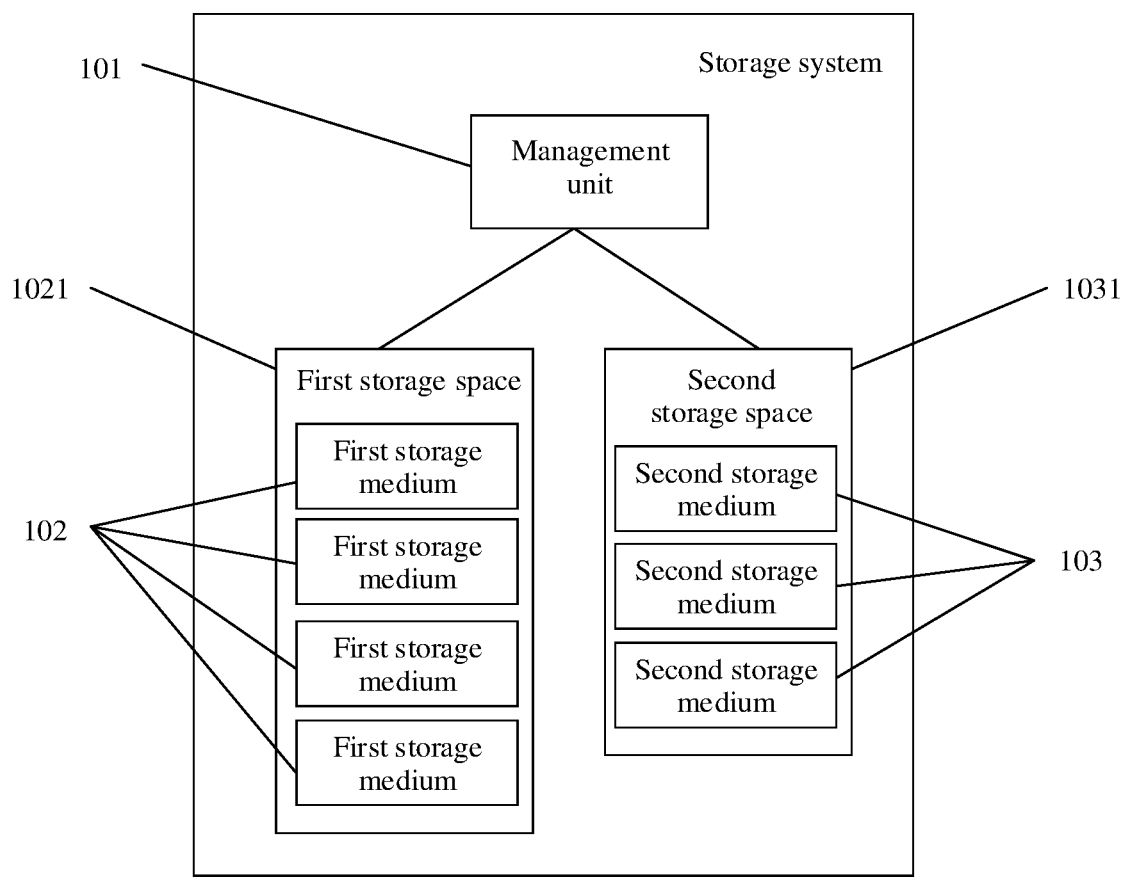
FIG. 1 is a schematic diagram of an example of a storage system according to an embodiment of this disclosure.

To make objectives, technical solutions, and advantages of embodiments of this disclosure clearer, the following describes the technical solutions in the embodiments of this disclosure in detail with reference to the accompanying drawings in this specification and specific implementations.

In the descriptions of this disclosure, "a plurality of" means two or more. Alternatively, "a plurality of" may be understood as "at least two". "At least one" may be understood as one or more, for example, one, two, or more. Including at least one means including one, two, or more, and does not limit what are included. For example, including at least one of A, B, and C may represent the following cases: A is included, B is included, C is included, A and B are included, A and C are included, B and C are included, and A and B and C are included. The term "and/or" describes an association relationship between associated objects and represents that three relationships may exist. For example, A and/or B may represent the following three cases: Only A exists, only B exists, and both A and B exist. In addition, the character "/", unless otherwise specified, generally indicates an "or" relationship between the associated objects.

Unless otherwise stated, ordinal terms such as "first" and "second" mentioned in this disclosure are used to distinguish between a plurality of objects, and are not intended to limit a sequence, a time sequence, a priority, or an importance degree of the plurality of objects.

The foregoing describes some concepts in this disclosure. The following describes a technical background of this disclosure.

In a big data era, an amount of data stored in a storage system explodes. Due to a limited storage space in the storage system, a large amount of stored data needs to be managed in order to ensure storage performance of the storage system. Tiered storage is a manner to manage data. To be specific, data is separately stored in storage media with different performance based on indicators such as data importance, access frequency, attribute information, and a size, and the data is automatically migrated between storage media by using a tiered storage technology.

A storage system using the tiered storage technology generally includes a plurality of storage media with different performance, for example, a serial advanced technology attachment (SATA) hard disk, a small computer system interface (SCSI) hard disk, a serial attached SCSI interface (SAS) hard disk, a fiber channel (FC) interface hard disk, and an SSD. A relationship between performance of the hard disks is as follows: SATA hard disk<SCSI hard disk<SAS hard disk<FC hard disk<SSD. A person skilled in the art may select, based on an actual use requirement, storage media with different performance to constitute different storage systems, for example, a level-3 storage system including three storage media with different performance, a level-5 storage system including five storage media with different performance. In addition, in the storage system, a preset tiered storage policy is stored, for example, a tiered storage policy of storing important data in a storage medium with good performance and storing unimportant data in a storage medium with poor performance, or a tiered storage policy of storing data with high access frequency in a storage medium with good performance and storing data with low access frequency in a storage medium with poor performance A person skilled in the art may perform setting based on a use requirement.

In the conventional technology, after receiving a data packet of to-be-stored data, the storage system using the tiered storage technology stores the data packet in a preset storage medium. The preset storage medium may be a storage medium with good performance in the storage system, for example, a SAS hard disk or an SSD. Then, at a regular interval, data stored in the entire storage system is scanned to determine a part of data packets that do not meet a preset tiered storage policy, and the part of data packets are migrated to an expected storage medium.

Because data migration consumes resources of the storage system, when a large quantity of data packets need to be migrated in the storage system, storage performance of the storage system deteriorates.

In view of this, the technical solutions in the embodiments of this disclosure are provided. In the embodiments of this disclosure, when data is to be stored, at least one piece of information: a type of the data, a name of the data, and a user identifier corresponding to the data is first obtained. Then, it is determined, based on the obtained at least one piece of information and according to a tiered storage policy preset by a storage system, whether the data needs to be stored in a storage space with good performance or a storage space with poor performance. Then, a data packet of the data is stored in a determined storage space. In this way, the data has been stored in the storage space corresponding to the tiered storage policy during storage, and the data does not need to be migrated subsequently. This can reduce an amount of data that needs to be migrated, reduce resource consumption of the storage system during data migration, and improve storage performance of the storage system.

The technical solutions in the embodiments of this disclosure are applied to a storage system using the tiered storage technology. The storage system may be a file storage system, a block storage system, an object storage system, or a combination of the foregoing storage systems. This is not limited in the embodiments of this disclosure.

FIG. 1 shows an example of a storage system according to an embodiment of this disclosure. As shown in FIG. 1, the storage system includes a management unit 101 and two storage media with different performance. The two storage media are a first storage medium 102 and a second storage medium 103. The management unit 101 is configured to manage an operation request, for example, a request of processing a write operation to write data into the storage medium, or a request of processing a read operation to obtain data from the storage medium. The management unit 101 may be a central processing unit (CPU), an application-specific integrated circuit (ASIC), a field programmable gate array (FPGA), or the like. The first storage medium 102 and the second storage medium 103 are configured to store data. Read/write performance of the first storage medium 102 is better than read/write performance of the second storage medium 103. For example, the first storage medium 102 may be an SSD or an FC hard disk, and the second storage medium 103 may be a SATA hard disk, a SAS hard disk, or a SCSI hard disk. Alternatively, the first storage medium 102 and the second storage medium 103 may be other storage media. This is not limited herein. A storage space constituted by at least one first storage medium 102 is referred to as a first storage space 1021, and a storage space constituted by at least one second storage medium 103 is referred to as a second storage space 1031. It should be noted that, when the first storage space 1021 is constituted by a quantity of storage spaces corresponding to a plurality of first storage media 102, the plurality of first storage media 102 may form a storage array in a coupling manner, and provide a service for a user together. The same applies to the second storage space 1031.

It should be noted that the storage system using the tiered storage technology is not limited to an architecture shown in FIG. 1. For example, the storage system may include three or more storage media with different performance, for example, four storage media with different performance, or the storage system may further include another apparatus, for example, a management apparatus. The storage system described in this embodiment of this disclosure is intended to describe the technical solutions in example embodiments of this disclosure more clearly, and does not constitute a limitation to the technical solutions provided in the embodiments of this disclosure. A person of ordinary skill in the art may learn that, with evolution of a storage technology and a storage system architecture, the technical solutions pro- vided in the embodiments of this disclosure are also applicable to a similar technical problem.

The following describes the technical solutions provided in the embodiments of this disclosure with reference to the accompanying drawings.

Figure 2:
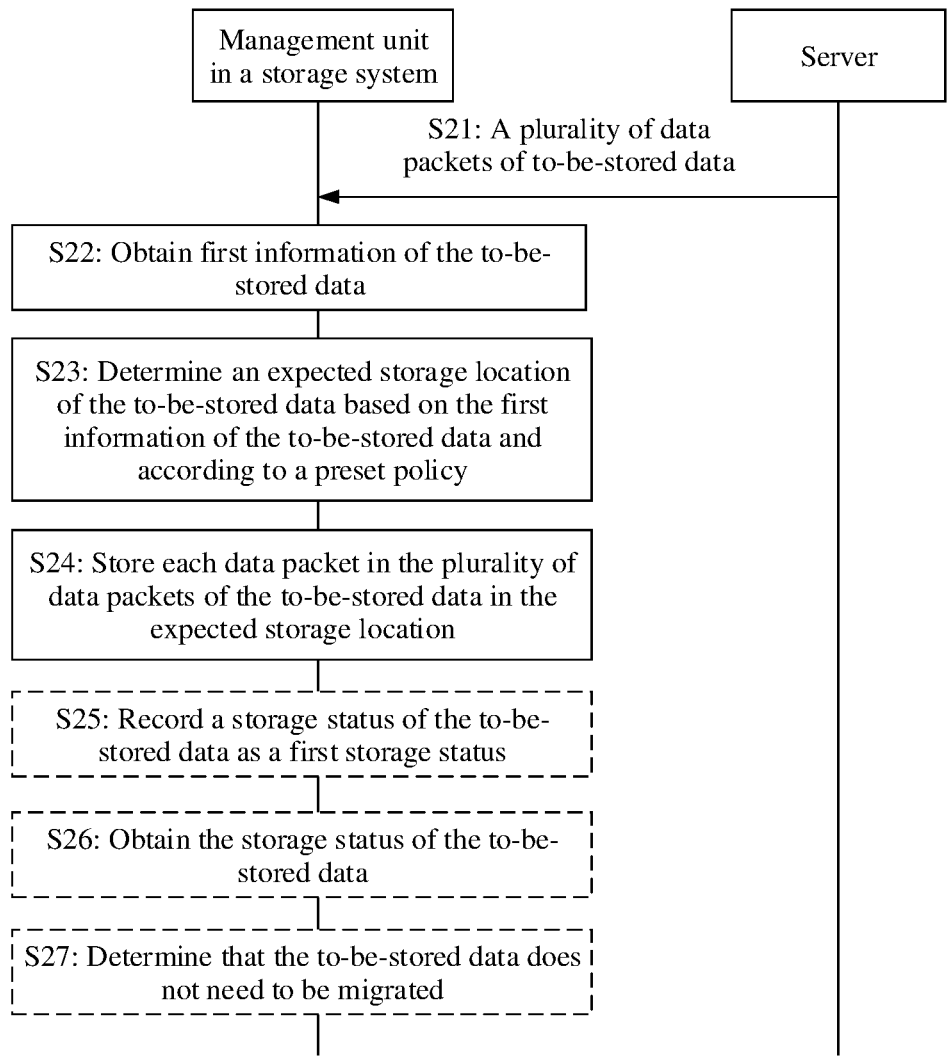
FIG. 2 is a flowchart of an example of a data storage method according to an embodiment of this disclosure.

An embodiment of this disclosure provides a data storage method. FIG. 2 is a flowchart of the method.

The following provides description by using an example in which the method is applied to the storage system shown in FIG. 1. In other words, in the following, the data storage method may be performed by the storage system shown in FIG. 1. In addition, the method may be performed by a communications apparatus. The communications apparatus may be a server in the storage system or a communications apparatus that can support the storage system in implementing a function required for the method. Alternatively, the communications apparatus may be another communications apparatus, for example, a chip system. An implementation of the communications apparatus is not limited herein. For ease of description, the following uses an example in which the method is performed by a management unit in the storage system.

S21: Another electronic device sends a plurality of data packets of to-be-stored data to the storage system, and the management unit in the storage system obtains the plurality of data packets.

During actual usage, the storage system usually collaborates with another electronic device to complete a data read/write process. The another electronic device may be a server, a client, or the like. In this way, a user may write data into the storage system by performing a data write operation on the another electronic device, or read data from the storage system by performing a data read operation on the another electronic device. For ease of description, the following provides description by using an example in which the another electronic device is a server.

For example, when the user needs to store data in the storage system, the user may perform a data write operation, for example, write data A. After detecting the data write operation, the server sends a data write request to the storage system. The data write request may include a plurality of data packets of the data A. In this way, after receiving the data write request, the management unit in the storage system may obtain the plurality of data packets of the to-be-stored data A from the data write request.

S22: The management unit in the storage system obtains first information of the to-be-stored data.

In this embodiment of this disclosure, the first information includes at least one piece of information: a type of the to-be-stored data, a name of the to-be-stored data, and a user identifier corresponding to the to-be-stored data.

In this embodiment of this disclosure, manners in which the management unit in the storage system obtains the first information include but are not limited to the following two manners:

A First Obtaining Manner:

The data write request sent by the server to the storage system may include the first information, for example, description information of the data A. The description information may include a type of the data A (for example, an RAR type, a JPEG type, or an avi type), a size of the data A (for example, 1 M or 30 kB), a name of the data A (for example, a photo 1 or JPG 2), a user identifier (for example, an IP address of the user or a user number), or the like. This is not limited herein. After receiving the data write request, the management unit in the storage system may obtain the description information of the data A from the data write request. The description information of the data A may be understood as the first information of the to-be-stored data (the data A).

A Second Manner:

When the storage system obtains the plurality of data packets of the data A from the data write request of the server, the management unit in the storage system may determine a type of the data A based on a correspondence between a header character and a data type and headers of the plurality of data packets of the data A. Specifically, Table 1 shows an example of the correspondence between a header character and a data type. The header character is represented by a hexadecimal number. As shown in Table 1, when the header character is "52617221", it indicates that the data type is an RAR type. When the header character is "504B0304", it indicates that the data type is a ZIP type. In this case, the type of the data A is the first information. It should be noted that content of the first information is preset by the storage system or a person skilled in the art. For example, the first information may be the type of the to-be-stored data, the name of the to-be-stored data, and the user identifier corresponding to the to-be-stored data. Alternatively, the first information may include only the type of the to-be-stored data. This is not limited herein.

TABLE 1

| Header character | Data type |
| --- | --- |
| 52617221 | RAR type |
| FFD8FF | JPEG type |
| 504B0304 | ZIP type |
| 47494638 | GIF type |
| . . . | . . . |

Alternatively, the management unit in the storage system may obtain the first information of the to-be-stored data in another manner. This is not limited herein.

S23: The management unit in the storage system determines an expected storage location of the to-be-stored data based on the first information of the to-be-stored data and according to a preset policy associated with the storage system.

In this embodiment of this disclosure, the preset policy is: when the first information meets a condition, determining that the expected storage location of the to-be-stored data is a first storage space whose read/write performance is higher than or equal to a threshold; when the first information does not meet the condition, determining that the expected storage location of the to-be-stored data is a second storage space whose read/write performance is lower than the threshold. A specific value of the threshold is not limited in this embodiment of this disclosure. The first storage space whose read/write performance is higher than or equal to the threshold and the second storage space whose read/write performance is lower than the threshold may be understood as that the read/write performance of the first storage space is higher than that of the second storage space. Specifically, in the storage system shown in FIG. 1, the first storage space may be understood as a storage space constituted by at least one first storage medium, and the second storage space may be understood as a storage space constituted by at least one second storage medium. For ease of description, the following uses an example in which the first storage space is an SSD and the second storage space is an HDD.

The following describes the preset policy. The preset policy may include but is not limited to the following three cases:

In a first case, the preset policy is: if the type of the to-be-stored data is the same as the preset type, determining that the expected storage location of the to-be-stored data is the SSD; when the type of the to-be-stored data is different from the preset type, determining that the expected storage location of the to-be-stored data is the HDD.

For example, the preset type may be the RAR type. After obtaining the first information of the data A, the management unit in the storage system obtains the type of the data A from the first information. For example, when the type of the data A is the JPEG type, the storage system determines that the type of the data A is not the RAR type, and then determines that the expected storage location of the data A is the HDD. The preset type may be specified in association with the preset policy associated with the storage system.

In a second case, the preset policy is: if the name of the to-be-stored data is the same as the preset name, determining that the expected storage location of the to-be-stored data is the SSD; when the name of the to-be-stored data is different from the preset name, determining that the expected storage location of the to-be-stored data is the HDD.

For example, the preset name is a name starting with photo. After obtaining the first information of the data A, the management unit in the storage system obtains the name of the data A from the first information. For example, when the name of the data A is JPEG 2, the storage system determines that the name of the data A is not starting with photo, and then determines that the expected storage location of the data A is the HDD. The preset name may be specified in association with the preset policy associated with the storage system.

In a third case, the preset policy is: if the user identifier corresponding to the to-be-stored data is the same as the preset user identifier, determining that the expected storage location of the to-be-stored data is the SSD; when the user identifier corresponding to the to-be-stored data is different from the preset user identifier, determining that the expected storage location of the to-be-stored data is the HDD.

For example, the following uses an example in which the user identifier is a user number, and the preset user identifier is ID1000. After obtaining the first information of the data A, the management unit in the storage system obtains the user number corresponding to the data A from the first information. For example, when the user number corresponding to the data A is ID100, the management unit in the storage system determines that the user number corresponding to the data A is different from the preset user identifier, and then determines that the expected storage location of the data A is the HDD. The preset user identifier may be specified in association with the preset policy associated with the storage system.

Certainly, the preset policy may be a combination of at least two of the foregoing three cases. For example, the preset policy may be a combination of the foregoing first case and second case, or the preset policy may be a combination of the foregoing three cases, or the like. In this case, a process in which the management unit in the storage system determines the expected storage location of the to-be-stored data is similar to the process in any one of the foregoing three cases.

Because the storage system may determine the expected storage location of the to-be-stored data based on related information of the to-be-stored data, this can resolve a problem that data having a relatively high requirement for read/write performance of a storage space is stored by default in a storage space with relatively low read/write performance and a data requirement cannot be met. In addition, this can resolve a problem that data having a relatively low requirement for read/write performance of a storage space is stored in a storage space with relatively high read/write performance and a storage resource with relatively high read/write performance is wasted.

S24: The management unit in the storage system stores each data packet in the plurality of data packets of the to-be-stored data in the expected storage location.

After determining the expected storage location of the to-be-stored data, the management unit in the storage system stores each received data packet of the to-be-stored data in the expected storage location. For example, after it is determined that the expected storage location of the data A is the HDD, the plurality of data packets of the data A are all stored onto the HDD. Because the to-be-stored data is stored in the expected storage location, when the management unit in the storage system scans all the stored data to determine whether the data needs to be migrated, the data has already been located in the target location, and the data does not need to be migrated. This can reduce an amount of data that needs to be migrated, and reduce resource consumption of the storage system during data migration.

S25: The management unit in the storage system records a storage status of the to-be-stored data as a first storage status.

In this embodiment of this disclosure, the storage status includes a first storage status (which may also be referred to as a migration-free status) in which the plurality of data packets of the to-be-stored data are stored in the expected storage location of the to-be-stored data, and a second storage status (which may also be referred to as a migration-required status) in which a subset of the plurality of data packets of the to-be-stored data are stored in the expected storage location and another subset of the plurality of data packets are stored in a first location different from the expected storage location. If the expected storage location is the first storage space with relatively high read/write performance, the first location is the second storage space with relatively low read/write performance. If the expected storage location is the second storage space with relatively low read/write performance, the first location is the first storage space with relatively high read/write performance.

For example, in S23, all data packets of the data A are stored in the expected storage location. Therefore, the management unit in the storage system may record the storage status of the data A as the first storage status. Specifically, the storage system may include a dedicated space, and the dedicated space is specially used to record a storage status of data. For example, the dedicated space may be reserved in the first storage space or the second storage space. If the storage system stores 10 pieces of data, the dedicated space may store 10 bits, and a storage status of each piece of data corresponds to one bit. When a value of the bit is 0, it indicates that a storage status of data corresponding to the bit is the migration-free status. When a value of the bit is 1, it indicates that a storage status of data corresponding to the bit is the migration-required status. If the data A is the first data stored in the storage system, the first bit in the dedicated space corresponds to the storage status of the data A, and the management unit in the storage system sets a value of the first bit in the dedicated space to 0. Alternatively, a storage status may be recorded in another manner. This is not limited herein.

It should be noted that, in this embodiment of this disclosure, an execution sequence of S24 and S25 is not limited. In other words, S24 may be performed before S25, S25 may be performed before S24, or S24 and S25 are performed at the same time. In FIG. 2, an example in which S24 is performed before S25 is used.

S26: The management unit in the storage system obtains the storage status of the to-be-stored data.

The storage system using the tiered storage technology scans data stored in the storage system at a regular interval to determine whether the data needs to be migrated. In this embodiment of this disclosure, because the management unit in the storage system records the storage status of each piece of data, for example, the storage status of each piece of data is stored in the dedicated space used to record the storage status. In this way, the management unit in the storage system may determine, based on the storage status, recorded in the dedicated space, of the data, whether the data needs to be migrated. This can reduce scanning time and reduce resource consumption of scanning. The data A is used as an example. The data A is the first data stored in the storage system, the management unit in the storage system obtains the value of the first bit in the dedicated space used to record the storage status, where the value of the first bit is 0.

S27: The management unit in the storage system determines that the to-be-stored data does not need to be migrated.

The management unit in the storage system determines that the value of the first bit that is corresponding to the data A and that is in the dedicated space used to record the storage status is 0, so that the management unit determines, based on a correspondence between a value of a bit and a storage status, that the data A does not need to be migrated.

In the foregoing technical solution, because the to-be-stored data has been stored in the expected storage location during storage, the storage system does not need to migrate the data. This can reduce an amount of data that needs to be migrated, reduce resource consumption during data migration, and improve storage performance of the storage system.

Further, because the to-be-stored data has been stored in the expected storage location during storage, all data stored in the storage system does not need to be migrated. In other words, S25 to S27 are optional steps and are not mandatory. Therefore, the storage system may skip a process of scanning the data to determine data that needs to be migrated. This can improve storage performance of the storage system.

Figure 3:
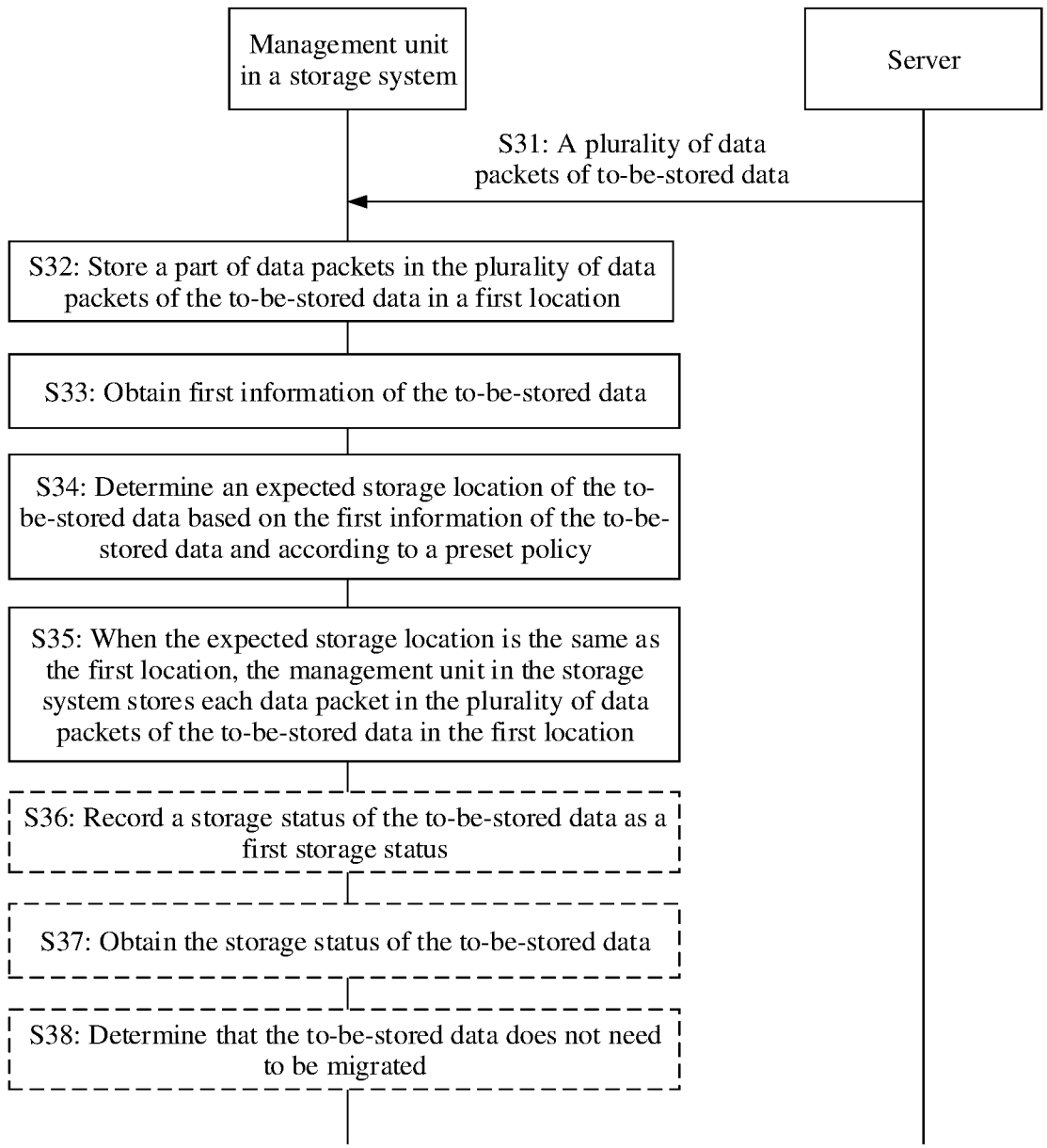
FIG. 3 is a flowchart of another example of a data storage method according to an embodiment of this disclosure.

In the embodiment shown in FIG. 2, before storing data, the storage system first determines an expected storage location of the data, and then stores the data in the expected storage location. Because it takes time for the storage system to determine the expected storage location of the data, in order not to affect a response speed of the storage system during data storage, FIG. 3 is a flowchart of another example of a data storage method according to this disclosure.

The following provides description by using an example in which the method is applied to the storage system shown in FIG. 1. In other words, in the following, the data storage method may be performed by the storage system shown in FIG. 1. In addition, the method may be performed by a communications apparatus. The communications apparatus may be a server in the storage system or a communications apparatus that can support the storage system in implementing a function required for the method. Certainly, the communications apparatus may alternatively be another communications apparatus, for example, a chip system. An implementation of the communications apparatus is not limited herein. For ease of description, the following uses an example in which the method is performed by a management unit in the storage system.

S31: Another electronic device sends a plurality of data packets of to-be-stored data to the storage system, and the management unit in the storage system obtains the plurality of data packets.

In this embodiment of this disclosure, the another electronic device may be a server, a client, or the like. The following provides description by using an example in which the another electronic device is a server. S31 is similar to S21.

S32: The management unit in the storage system stores a part of data packets in the plurality of data packets of the to-be-stored data in a first location.

In this embodiment of this disclosure, the first location is a default location of the storage system. In other words, the management unit in the storage system stores at least one part of data packets of each piece of received data in the first location. The storage system shown in FIG. 1 includes a first storage space and a second storage space. The first location may be the first storage space, or may be the second storage space. A person skilled in the art may perform setting based on an actual use requirement. This is not limited herein. For ease of description, the following uses an example in which the first storage space is an SSD, the second storage space is an HDD, and the first location is the HDD.

For example, the to-be-stored data is data A, and the data A includes 10 data packets. After obtaining the 10 data packets of the data A based on a data write request of the server, the management unit in the storage system writes the 10 data packets into a storage space of the storage system in sequence. The management unit in the storage system may write the 10 data packets one by one in a unit of a data packet. In other words, after the first data packet is written onto the HDD, the second data packet is written onto the HDD. Alternatively, the management unit in the storage system may split a data packet into a plurality of data blocks, and then write the 10 data packets one by one in a unit of a data block. For example, the management unit in the storage system splits each data packet into three data blocks, writes three data blocks corresponding to the first data packet onto the HDD, and then writes three data blocks corresponding to the second data packet onto the HDD.

S33: The management unit in the storage system obtains first information of the to-be-stored data.

After writing the part of data packets of the to-be-stored data onto the HDD, the management unit in the storage system obtains the first information of the to-be-stored data. Content of the first information and a manner of obtaining the first information are the same as those in S22.

S34: The management unit in the storage system determines an expected storage location of the to-be-stored data based on the first information of the to-be-stored data and according to a preset policy.

S34 is similar to S23.

It should be noted that the expected storage location determined by the management unit in the storage system may be the same as the first location, or may be different from the first location. For example, if the management unit in the storage system determines that the expected storage location is the HDD, the expected storage location is the same as the first location. If the management unit in the storage system determines that the expected storage location of the to-be-stored data is the SSD, the expected storage location is different from the first location. In this embodiment of this disclosure, the following provides description by using an example in which the expected storage location is the same as the first location.

S35: When the expected storage location is the same as the first location, the management unit in the storage system stores each data packet in the plurality of data packets of the to-be-stored data in the first location.

S36: The management unit in the storage system records a storage status of the to-be-stored data as a first storage status.

S37: The management unit in the storage system obtains the storage status of the to-be-stored data.

S38: The management unit in the storage system determines that the to-be-stored data does not need to be migrated.

S35 to S38 are similar to S24 to S27. S36 to S38 are optional steps. In other words, S36 to S38 are not mandatory.

In the foregoing technical solution, after obtaining the to-be-stored data, the storage system first stores the part of data packets of the data in the default location, and then determines the expected storage location of the data during storage. This can reduce response duration of the storage system when the data is stored.

Figure 4:
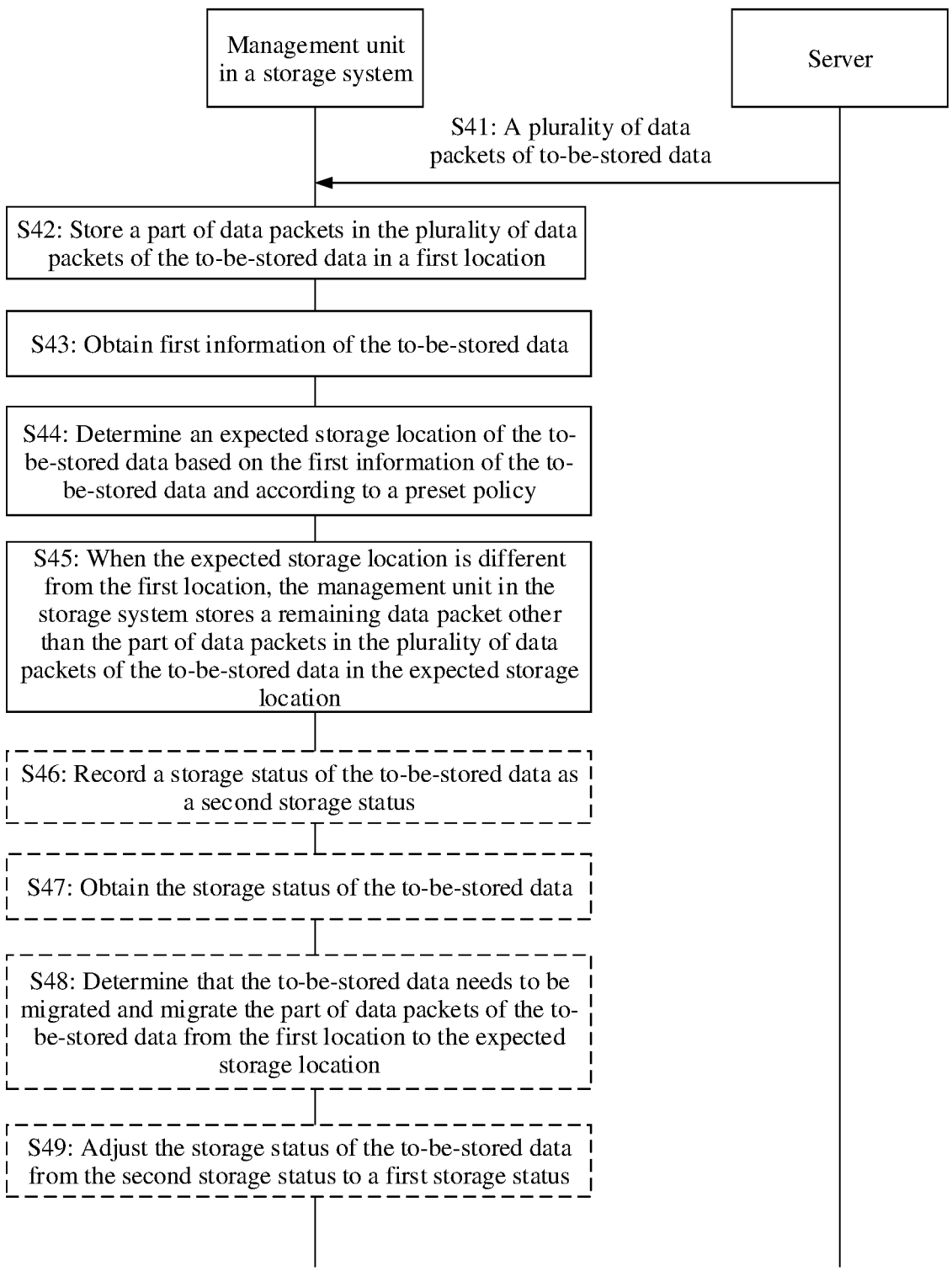
FIG. 4 is a flowchart of another example of a data storage method according to an embodiment of this disclosure.

The embodiment shown in FIG. 3 describes an example in which the expected storage location of the data is determined during storage and the expected storage location is the same as the first location. The following provides description by using an example in which the expected storage location of the data is determined during storage and the expected storage location is different from the first location. FIG. 4 is a flowchart of another example of a data storage method according to this disclosure.

The following provides description by using an example in which the method is applied to the storage system shown in FIG. 1. In other words, in the following, the data storage method may be performed by the storage system shown in FIG. 1. In addition, the method may be performed by a communications apparatus. The communications apparatus may be a server in the storage system or a communications apparatus that can support the storage system in implementing a function required for the method. Certainly, the communications apparatus may alternatively be another communications apparatus, for example, a chip system. An implementation of the communications apparatus is not limited herein. For ease of description, the following uses an example in which the method is performed by a management unit in the storage system.

S41: Another electronic device sends a plurality of data packets of to-be-stored data to the storage system, and the management unit in the storage system obtains the plurality of data packets.

S42: The management unit in the storage system stores a part of data packets in the plurality of data packets of the to-be-stored data in a first location.

S43: The management unit in the storage system obtains first information of the to-be-stored data.

S44: The management unit in the storage system determines an expected storage location of the to-be-stored data based on the first information of the to-be-stored data and according to a preset policy.

S41 to S44 are similar to S31 to S34.

In this embodiment of this disclosure, the following provides description by using an example in which the expected storage location is different from the first location.

S45: When the expected storage location is different from the first location, the management unit in the storage system stores a remaining data packet other than the part of data packets in the plurality of data packets of the to-be-stored data in the expected storage location.

For example, in S42, the management unit in the storage system stores the first two data packets of data A in the first location, that is, stores onto an HDD. When the management unit in the storage system determines that an expected storage location of the data A is an SSD and is different from the first location, the management unit in the storage system stores remaining 8 data packets of the data A onto the SSD.

S46: The management unit in the storage system records a storage status of the to-be-stored data as a second storage status.

Because the part of data packets of the data A are stored on the HDD, and the other part of data packets are stored on the SSD, the management unit in the storage system records a storage status of the data A as the second storage status in which data needs to be migrated.

S47: The management unit in the storage system obtains the storage status of the to-be-stored data.

S47 is similar to S26.

S48: The management unit in the storage system determines that the to-be-stored data needs to be migrated, and migrates the part of data packets of the to-be-stored data from the first location to the expected storage location.

In this embodiment of this disclosure, if the management unit in the storage system learns that the storage status of the to-be-stored data (the data A) is the second storage status, the management unit in the storage system determines that the to-be-stored data needs to be migrated, and migrates the part of data packets of the data A that are stored in the first location to the expected storage location of the data A.

S49: The management unit in the storage system adjusts the storage status of the to-be-stored data from the second storage status to a first storage status.

After the storage system completes data migration, all data packets of the data are stored in the expected storage location. Therefore, the data does not need to be migrated, and the management unit in the storage system updates the storage status of the data to the first storage status.

It should be noted that S46 to S49 are optional steps. In other words, S46 to S49 are not mandatory.

In the foregoing technical solution, because the part of data packets of the data have been stored in the expected storage location when the data is stored, only the other part of data packets of the data need to be migrated during data migration. Therefore, this can reduce an amount of data that needs to be migrated, reduce storage resource consumption of data migration, and improve storage performance of the storage system.

The foregoing describes an overall procedure of the data storage method in the storage system in the embodiments of this disclosure. The following describes the foregoing technical solutions by using a specific storage system (for example, a file storage system) as an example.

First, a data storage principle of the file storage system is described.

Data stored in the file storage system is classified into two types: data and metadata. The data may be understood as actual data in a file. For example, the file is a picture, and the actual data of the file is information such as a person, an animal, and an environment that is included in the picture. The metadata is data used to describe attribute information of a file, for example, access permission of the file, an owner of the file, and a storage location of the file. If a user needs to perform an operation on a file in the file storage system, the user first needs to obtain metadata of the file, and then can locate a location of the file based on the metadata and obtain actual data in the file. In the file storage system, metadata may be managed in two manners: centralized management and distributed management. The centralized management means that a storage space is specified in the file system and is dedicated to storing metadata of all files. For example, the metadata of all files is stored on an SSD, and this can facilitate management of files in the file storage system. It should be noted that, in this case, because different files may be stored in different locations, for example, some files are stored on an HDD, and some files are stored on the SSD, a file and metadata of the file are stored in different storage media. The distributed management means that metadata is stored in any storage space in the file system. For example, metadata may be stored together with each file. If a file is stored on the HDD, metadata of the file is also stored on the HDD. If a file is stored on the SSD, metadata of the file is also stored on the SSD. In this way, responsibilities of metadata management are distributed to different storage spaces, to resolve a problem that the entire file storage system cannot be used when a storage space for storing metadata is faulty in the centralized management manner.

Figure 5:
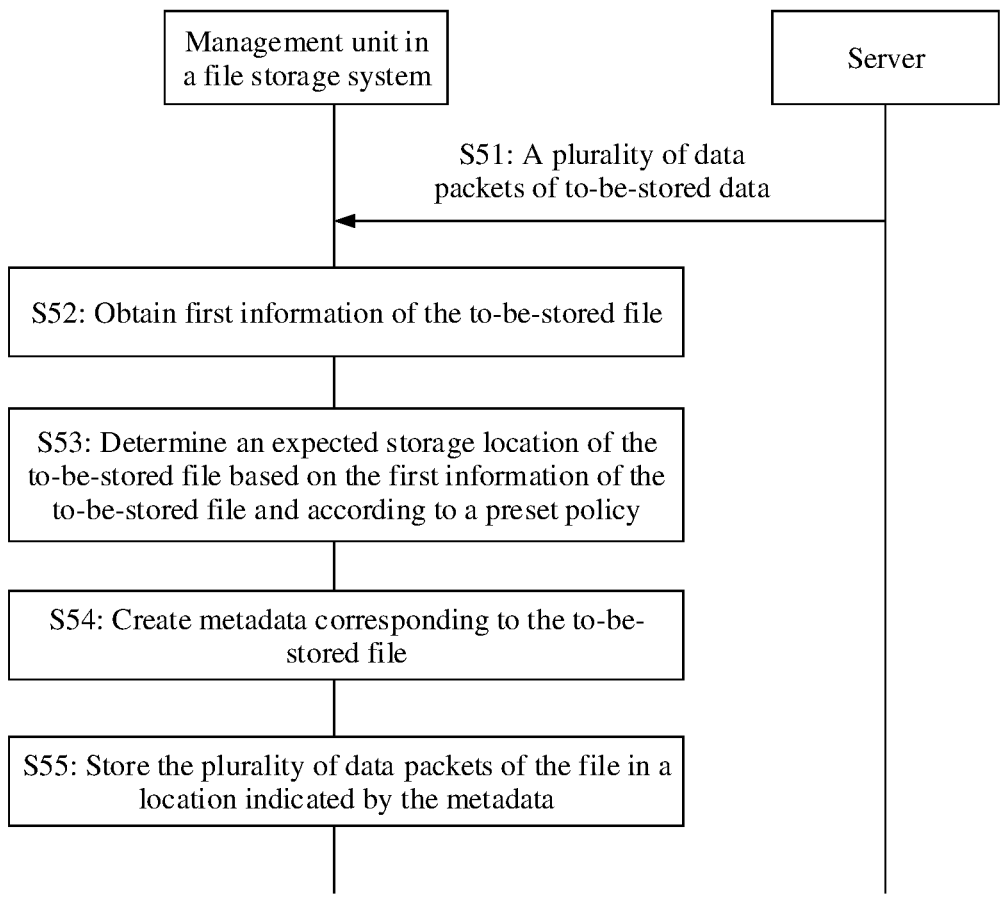
FIG. 5 is a flowchart of another example of a data storage method according to an embodiment of this disclosure.

According to the foregoing principle, the following describes an execution process of a data storage method in the file storage system according to an embodiment of this disclosure. FIG. 5 is a flowchart of the method.

The following provides description by using an example in which the method is applied to the storage system shown in FIG. 1. In other words, in the following, the data storage method may be performed by the storage system shown in FIG. 1. In addition, the method may be performed by a communications apparatus. The communications apparatus may be a server in the storage system or a communications apparatus that can support the storage system in implementing a function required for the method. Certainly, the communications apparatus may alternatively be another communications apparatus, for example, a chip system. An implementation of the communications apparatus is not limited herein. For ease of description, the following uses an example in which the method is performed by a management unit in the storage system and the storage system is a file storage system.

S51: Another electronic device sends a plurality of data packets of a to-be-stored file to the file storage system, and the management unit in the file storage system obtains the plurality of data packets.

S51 is similar to S21.

S52: The management unit in the file storage system obtains first information of the to-be-stored file.

S53: The management unit in the file storage system determines an expected storage location of the to-be-stored file based on the first information of the to-be-stored file and according to a preset policy.

S52 and S53 are similar to S22 and S23.

S54: The management unit in the file storage system creates metadata corresponding to the to-be-stored file.

After determining the expected storage location of the to-be-stored file, the management unit in the file storage system creates, based on the expected storage location of the file, the metadata corresponding to the to-be-stored file.

In this embodiment of this disclosure, the following two types of information are added to metadata in the conventional technology.

The first type of information is an expected storage location of a file, and the location is denoted as Store tier. The expected storage location of the file may be a first storage space, or may be a second storage space. For ease of description, the following uses an example in which the first storage space is an SSD and the second storage space is an HDD.

The second type of information is a storage status, and the status is denoted as Status. For description of the storage status, refer to corresponding content in S25. In this embodiment of this disclosure, when the metadata is created, a storage status is set to a first storage status by default.

For example, two fields may be added to metadata in the conventional technology to respectively indicate the first type of information and the second type of information. For example, a length of each field is one bit. If the metadata in the conventional technology includes 10 bits, the metadata in this embodiment of this disclosure may include 12 bits, and the eleventh bit is used to indicate an expected storage location of a file. When a value of the bit is 0, it indicates that the expected storage location of the file is the HDD. When a value of the bit is 1, it indicates that the expected storage location of the file is the SSD. The twelfth bit is used to indicate a storage status of a file. When a value of the bit is 0, it indicates that the storage status of the file is the first storage status (namely, a migration-free status). When a value of the bit is 1, it indicates that the storage status of the file is a second storage status (namely, a migration-required status). After the management unit in the file storage system determines the expected storage location of the to-be-stored file, for example, determines that the expected storage location of the file is the HDD, when creating metadata of the file, the management unit in the file storage system sets the eleventh bit of the metadata to 0, and sets the storage status of the file to the first storage status. In other words, the twelfth bit of the metadata is set to 0.

S55: The management unit in the file storage system stores the plurality of data packets of the file in a location indicated by the metadata.

After creating the metadata corresponding to the file, the management unit in the file storage system stores the data packets of the file in an expected storage location indicated by the metadata.

In this way, when creating the metadata of the file, the file storage system actively determines the expected storage location of the file according to the specified policy, so that the data packets of the file are directly stored in the expected storage location, and a process of scanning the file periodically and performing data migration can be skipped. This can improve performance of the file storage system.

Figure 6:
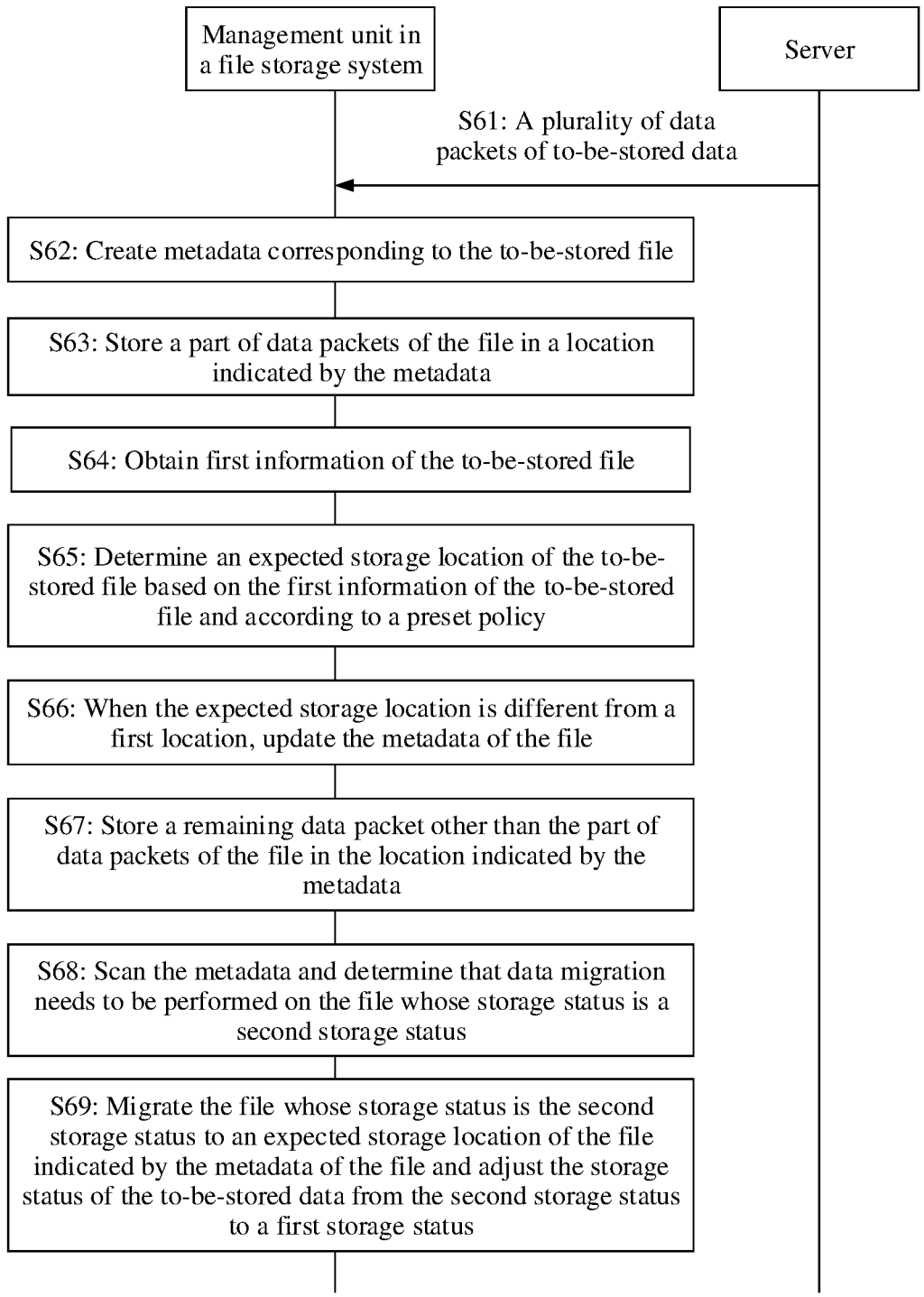
FIG. 6 is a flowchart of another example of a data storage method according to an embodiment of this disclosure.

In order not to affect a speed of creating metadata, FIG. 6 is a flowchart of another example of a data storage method according to this disclosure.

The following provides description by using an example in which the method is applied to the storage system shown in FIG. 1. In other words, in the following, the data storage method may be performed by the storage system shown in FIG. 1. In addition, the method may be performed by a communications apparatus. The communications apparatus may be a server in the storage system or a communications apparatus that can support the storage system in implementing a function required for the method. Alternatively, the communications apparatus may be another communications apparatus, for example, a chip system. An implementation of the communications apparatus is not limited herein. For ease of description, the following uses an example in which the method is performed by a management unit in the storage system and the storage system is a file storage system.

S61: Another electronic device sends a plurality of data packets of a to-be-stored file to the file storage system, and the management unit in the file storage system obtains the plurality of data packets.

S61 is similar to S21.

S62: The management unit in the file storage system creates metadata corresponding to the to-be-stored file.

In this embodiment of this disclosure, the following two types of information are added to metadata in the conventional technology: an expected storage location of a file and a storage status. In order not to affect a speed of creating metadata, when creating the metadata, the management unit in the file storage system presets an expected storage location of a file. To be specific, for any to-be-stored file, when metadata of the file is created, an expected storage location of the file indicated by the metadata is the same. For example, the preset location may be a first storage space, or may be a second storage space. For ease of description, the following uses an example in which the first storage space is an SSD, the second storage space is an HDD, and the preset location is the HDD. Description of the storage status is the same as that in S52.

For example, two fields are added to the metadata to indicate the expected storage location and the storage status of the file. Meanings of a length and a value of each field are the same as those in S52, and details are not described herein again. For example, the preset location is the HDD, and the management unit in the file storage system sets a value of a bit that is in the metadata and that is used to indicate the expected storage location of the file to 0.

S63: The management unit in the file storage system stores a part of data packets of the to-be-stored file in a location indicated by the metadata.

After creating the metadata corresponding to the file, the management unit in the file storage system stores, in sequence, the data packets of the file in an expected storage location indicated by the metadata, namely, the HDD.

S64: The management unit in the file storage system obtains first information of the to-be-stored file.

S65: The management unit in the file storage system determines an expected storage location of the to-be-stored file based on the first information of the to-be-stored file and according to a preset policy.

S64 and S65 are the same as S52 and S53, and details are not described herein again.

S66: When the expected storage location of the file is different from the location indicated by the metadata, the management unit in the file storage system updates the metadata of the file.

When determining that the expected storage location of the file is different from the location indicated by the metadata, the management unit in the file storage system updates, by using the determined expected storage location of the file, a value of the field that is in the metadata and that is used to indicate the expected storage location of the file, and updates the storage status of the file in the metadata. For example, when the management unit in the file storage system determines that the expected storage location of the file is the SSD, and the expected storage location indicated by the metadata is the HDD, the expected storage location indicated by the metadata needs to be changed from the HDD to the SSD. To be specific, a value of a bit that is in the metadata and that is used to indicate the expected storage location of the file is reset to 1, and the storage status of the file is updated to the second storage status. In other words, a value of a bit that is in the metadata and that is used to indicate the storage status of the file is reset to 1.

S67: The management unit in the file storage system stores a remaining data packet other than the part of data packets of the to-be-stored file in the location indicated by the metadata.

Because the expected storage location of the file indicated by the metadata is changed, a storage location of the file in the file storage system is also changed. For example, the expected storage location of the file indicated by the metadata is changed to the SSD, and the remaining data packet of the file is stored onto the SSD.

S68: The management unit in the file storage system scans the metadata, and determines that data migration needs to be performed on the file whose storage status is the second storage status.

S69: The management unit in the file storage system migrates the file whose storage status is the second storage status to the expected storage location of the file indicated by the metadata of the file.

In the foregoing technical solution, the file storage system determines an expected storage location of a file during file storage. This can ensure that an operation delay of creating metadata of the file is not increased. In addition, in the foregoing technical solution, a part of data packets of the file have been stored in the expected storage location during file storage. Therefore, this can reduce an amount of data that needs to be migrated, and improve storage performance of the storage system.

The foregoing embodiments of this disclosure describe the method provided in the embodiments of this disclosure from a perspective of interaction between the storage system and the server. To implement functions in the method provided in the embodiments of this disclosure, the storage system may include a hardware structure and/or a software module, and implement the functions in a form of the hardware structure, the software module, or a combination of the hardware structure and the software module. Whether a function in the foregoing functions is performed in a form of the hardware structure, the software module, or both the hardware structure and the software module depends on a specific application and a design constraint condition of the technical solutions.

Figure 7:
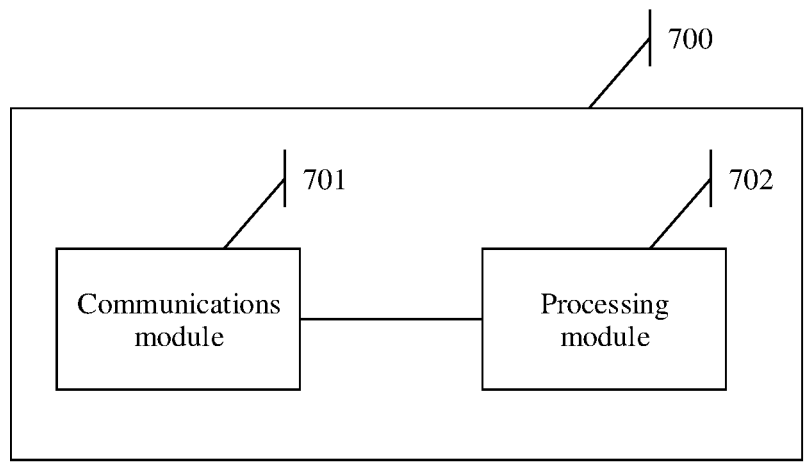
FIG. 7 is a schematic structural diagram of an example of a data storage apparatus according to an embodiment of this disclosure.

FIG. 7 is a schematic structural diagram of a data storage apparatus 700. The data storage apparatus 700 may be applied to a storage system or an apparatus in a storage system, and can implement a function of the storage system in the method provided in the embodiments of this disclosure. The data storage apparatus 700 may alternatively be an apparatus that can support the storage system in implementing a function of the storage system in the method provided in the embodiments of this disclosure. The data storage apparatus 700 may be a hardware structure, a software module, or a combination of a hardware structure and a software module. The data storage apparatus 700 may be implemented by a chip system. In this embodiment of this disclosure, the chip system may include a chip, or may include a chip and another discrete component.

The data storage apparatus 700 may include a communications module 701 and a processing module 702.

The communications module 701 may be configured to perform step S21 in the embodiment shown in FIG. 2, and/or configured to perform step S31 in the embodiment shown in FIG. 3, and/or configured to perform step S41 in the embodiment shown in FIG. 4, and/or configured to perform step S51 in the embodiment shown in FIG. 5, and/or configured to perform step S61 in the embodiment shown in FIG. 6, and/or configured to support another process of the technology described in this specification. The communications module 701 is used by the data storage apparatus 700 to communicate with another module, and may be a circuit, a component, an interface, a bus, a software module, a transceiver, or any other apparatus that can implement communication.

The processing module 702 may be configured to perform step S22 to step S26 in the embodiment shown in FIG. 2, and/or configured to perform step S32 to step S38 in the embodiment shown in FIG. 3, and/or configured to perform step S42 to step S49 in the embodiment shown in FIG. 4, and/or configured to perform step S52 to step S55 in the embodiment shown in FIG. 5, and/or configured to perform step S62 to step S69 in the embodiment shown in FIG. 6, and/or configured to support another process of the technology described in this specification.

All related content of the steps in the foregoing method embodiments may be cited in function descriptions of corresponding function modules.

Division into modules in the embodiments of this disclosure is an example, is only logical function division, and may be other division in an actual implementation. In addition, function modules in the embodiments of this disclosure may be integrated into one processor, or may exist alone physically, or two or more modules are integrated into one module. The integrated module may be implemented in a form of hardware, or may be implemented in a form of a software functional module.

Figure 8:
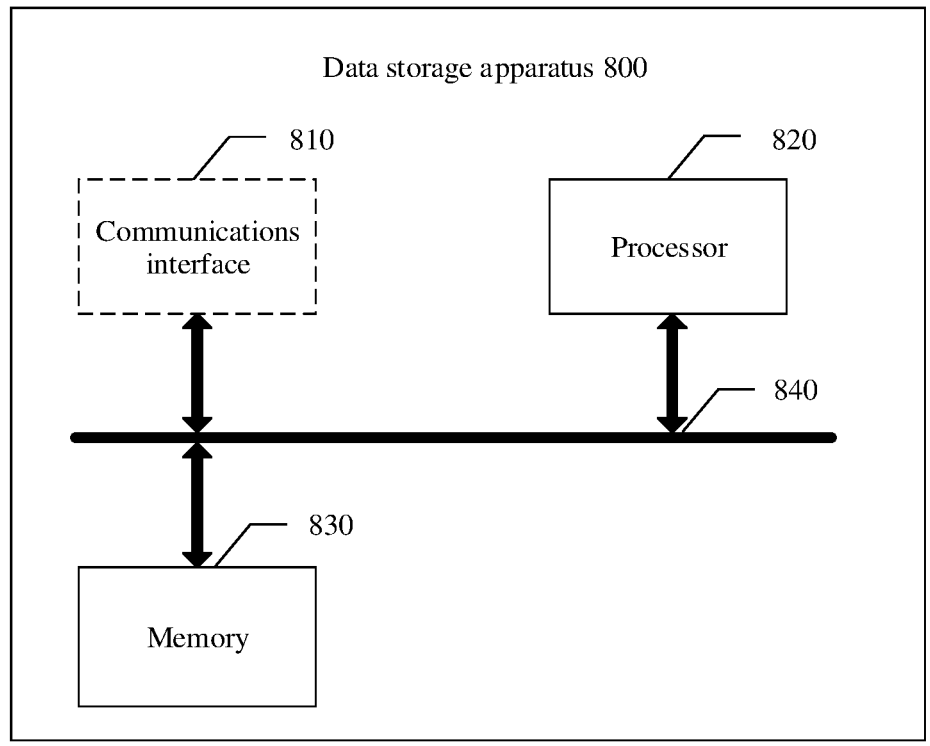
FIG. 8 is a schematic structural diagram of another example of a data storage apparatus according to an embodiment of this disclosure.

As shown in FIG. 8, an embodiment of this disclosure provides a data storage apparatus 800. The data storage apparatus 800 may be the storage system in the embodiments shown in FIG. 2 to FIG. 6, or an apparatus in the storage system, and can implement a function of the storage system in the embodiments of this disclosure shown in FIG. 2 to FIG. 6. The data storage apparatus 800 may alternatively be an apparatus that can support the storage system in implementing a function of the storage system in the method provided in the embodiments of this disclosure shown in FIG. 2 to FIG. 6. The data storage apparatus 800 may be a chip system. In this embodiment of this disclosure, the chip system may include a chip, or may include a chip and another discrete component.

The data storage apparatus 800 includes at least one processor 820, configured to implement or support the data storage apparatus 800 in implementing a function of the management unit in the storage system in the embodiments of this disclosure shown in FIG. 2 to FIG. 6. For example, the processor 820 may obtain first information of to-be-stored data, and determine an expected storage location of the to-be-stored data based on the first information and according to a preset policy. For details, refer to detailed descriptions in the method example.

The data storage apparatus 800 may further include at least one memory 830, configured to store program instructions and/or data. The memory 830 is coupled to the processor 820. Coupling in this embodiment of this disclosure is an indirect coupling or a communication connection between apparatuses, units, or modules, may be in an electrical, a mechanical, or another form, and is used for information exchange between the apparatuses, the units, or the modules. The processor 820 may operate with the memory 830. The processor 820 may execute the program instructions stored in the memory 830. At least one of the at least one memory may be included in the processor. When executing the program instructions in the memory 830, the processor 820 can implement the method shown in FIG. 2 to FIG. 6.

The data storage apparatus 800 may further include a communications interface 810, configured to communicate with another device through a transmission medium, so that the communications interface 810 is used by the data storage apparatus 800 to communication with the another device. For example, the another device may be a server. The processor 820 may send and receive data through the communications interface 810.

In this embodiment of this disclosure, a specific connection medium between the communications interface 810, the processor 820, and the memory 830 is not limited. In this embodiment of this disclosure, the memory 830, the processor 820, and the communications interface 810 are connected through a bus 840 in FIG. 8, and the bus is represented by a thick line in FIG. 8. A connection manner between other components is schematically described, and is not limited thereto. The bus may be classified into an address bus, a data bus, a control bus, or the like. For ease of representation, only one thick line is used to represent the bus in FIG. 8, but this does not mean that there is only one bus or only one type of bus.

In the embodiments of this disclosure, the processor 820 may be a general-purpose processor, a digital signal processor, an ASIC, a FPGA or another programmable logic device, a discrete gate or transistor logic device, or a discrete hardware component, and may implement or perform the methods, steps, and logical block diagrams disclosed in the embodiments of this disclosure. The general-purpose processor may be a microprocessor or any conventional processor or the like. The steps of the method disclosed with reference to the embodiments of this disclosure may be directly performed by a hardware processor, or may be performed by using a combination of hardware in the processor and a software module.

In this embodiment of this disclosure, the memory 830 may be a non-volatile memory, such as a hard disk drive (HDD) or a solid-state drive (SSD), or may be a volatile memory, such as a random access memory (RAM). The memory is any other medium that can be used to include or store expected program code in a form of an instruction or a data structure and that can be accessed by a computer. However, this is not limited thereto. The memory in the embodiments of this disclosure may alternatively be a circuit or any other apparatus that can implement a storage function, and is configured to store program instructions and/or data.

An embodiment of this disclosure further provides a computer-readable storage medium including instructions. When the instructions are run on a computer, the computer is enabled to perform the method implemented by the storage array in the embodiments shown in FIG. 2 to FIG. 6.

An embodiment of this disclosure further provides a computer program product including instructions. When the instructions are run on a computer, the computer is enabled to perform the method implemented by the storage array in the embodiments shown in FIG. 2 to FIG. 6.

An embodiment of this disclosure provides a chip system. The chip system includes a processor and may further include a memory, and is configured to implement a function of the storage system in the foregoing method. The chip system may include a chip, or may include a chip and another discrete component.

All or some of the foregoing methods in the embodiments of this disclosure may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to the embodiments of this disclosure are all or partially generated. The computer may be a general-purpose computer, a special-purpose computer, a computer network, a network device, a user device, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, through a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A data storage method, comprising:
   obtaining first information of to-be-stored data, wherein the first information comprises at least one piece of information, and wherein the information comprises one or more of a type of the to-be-stored data, a name of the to-be-stored data, and a user identifier corresponding to the to-be-stored data;
   determining an expected storage location of the to-be-stored data based on the first information, wherein the determining comprises determining that the expected storage location is a first storage space when the first information meets a first condition and determining that the expected storage location is a second storage space when the first information meets a second condition, read/write performance of the first storage space being higher than read/write performance of the second storage space;
   creating metadata corresponding to the to-be-stored data based on the determined expected storage location of the to-be-stored data, the metadata comprising a first field specifying the determined expected storage location of the to-be-stored data; and
   storing at least one data packet in a plurality of data packets of the to-be-stored data in the expected storage location in accordance with the created metadata.

2. The method according to claim 1, wherein the first condition comprises at least one of the following conditions:
   the type of the to-be-stored data is the same as a preset type;
   the name of the to-be-stored data is the same as a preset name; and
   the user identifier corresponding to the to-be-stored data is the same as a preset user identifier.

3. The method according to claim 1, the storing at least one data packet in a plurality of data packets of the to-be-stored data in the expected storage location comprises storing each data packet in the plurality of data packets in the expected storage location.

4. The method according to claim 1, the method further comprises:
  storing a first data packet in the plurality of data packets of the to-be-stored data in a first location, wherein the first location is different from the expected storage location; and
  storing a second data packet in the plurality of data packets in the expected storage location.

5. The method according to claim 4, wherein the method further comprises migrating the first data packet from the first location to the expected storage location.

6. The method according to claim 1, wherein the metadata further comprises a second field indicating whether the to-be-stored data needs to be migrated between the first storage space and the second storage space.

7. The method according to claim 6, wherein a length of the first field is one bit and a length of the second field is one bit.

8. The method according to claim 1, wherein the metadata and the to-be-stored data are stored in a same storage space.

9. The method according to claim 1, wherein the metadata and the to-be-stored data are stored in different storage spaces.

10. A data storage apparatus, comprising:
  a communications interface; and
  a processor coupled to the communications interface and configured to:
    obtain first information of to-be-stored data, wherein the first information comprises at least one piece of information, and wherein the information comprises one or more of a type of the to-be-stored data, a name of the to-be-stored data, and a user identifier corresponding to the to-be-stored data;
    determine an expected storage location of the to-be-stored data based on the first information, wherein the determining comprises determining that the expected storage location is a first storage space when the first information meets a first condition and determining that the expected storage location is a second storage space when the first information meets a second condition, read/write performance of the first storage space being higher than read/write performance of the second storage space;
    create metadata corresponding to the to-be-stored data based on the determined expected storage location of the to-be-stored data, the metadata comprising a first field specifying the determined expected storage location of the to-be-stored data; and
    store, in the expected storage location, at least one data packet in a plurality of data packets of the to-be-stored data received through the communications interface in accordance with the created metadata.

11. The apparatus according to claim 10, wherein the first condition comprises at least one of the following conditions:
  the type of the to-be-stored data is the same as a preset type;
  the name of the to-be-stored data is the same as a preset name; and
  the user identifier corresponding to the to-be-stored data is the same as a preset user identifier.

12. The apparatus according to claim 10, wherein the processor is configured to store each data packet in the plurality of data packets in the expected storage location.

13. The apparatus according to claim 10, wherein the processor is further configured to:
  store a first packet in the plurality of data packets of the to-be-stored data in a first location, wherein the first location is different from the expected storage location; and
  store a second data packet in the plurality of data packets in the expected storage location.

14. The apparatus according to claim 13, wherein the processor is further configured to migrate the part of data packets of the to-be-stored data from the first location to the expected storage location.

15. A non-volatile computer-readable storage medium, wherein the medium stores instructions, and when the instructions are run on a computer, the computer is enabled to perform steps of:
  obtaining first information of to-be-stored data, wherein the first information comprises at least one piece of information, and wherein the information comprises one or more of a type of the to-be-stored data, a name of the to-be-stored data, and a user identifier corresponding to the to-be-stored data;
  determining an expected storage location of the to-be-stored data based on the first information, wherein the determining comprises determining that the expected storage location is a first storage space when the first information meets a first condition and determining that the expected storage location is a second storage space when the first information meets a second condition, read/write performance of the first storage space being higher than read/write performance of the second storage space;
  creating metadata corresponding to the to-be-stored data based on the determined expected storage location of the to-be-stored data, the metadata comprising a first field specifying the determined expected storage location of the to-be-stored data; and
  storing at least one data packet in a plurality of data packets of the to-be-stored data in the expected storage location in accordance with the created metadata.

16. The non-volatile computer-readable storage medium according to claim 15, wherein the first condition comprises at least one of the following conditions:
  the type of the to-be-stored data is the same as a preset type;
  the name of the to-be-stored data is the same as a preset name; and
  the user identifier corresponding to the to-be-stored data is the same as a preset user identifier.

17. The non-volatile computer-readable storage medium according to claim 15, wherein the storing at least one data packet in a plurality of data packets of the to-be-stored data in the expected storage location comprises storing each data packet in the plurality of data packets in the expected storage location.

18. The non-volatile computer-readable storage medium according to claim 15, wherein the computer is further enabled to perform steps of:
  storing a first data packet in the plurality of data packets of the to-be-stored data in a first location, wherein the first location is different from the expected storage location; and
  storing a second data packet in the plurality of data packets in the expected storage location.

19. The non-volatile computer-readable storage medium according to claim 18, wherein the computer is further enabled to perform step of migrating the first data packet from the first location to the expected storage location.

* * * * *